United States Patent
Klein

(10) Patent No.: US 11,615,578 B1
(45) Date of Patent: Mar. 28, 2023

(54) SYSTEMS AND METHODS FOR EFFICIENT RENDERING AND PROCESSING OF POINT CLOUDS USING TEXTURES

(71) Applicant: Illuscio, Inc., Culver City, CA (US)

(72) Inventor: Alexandre Leuckert Klein, Novo Hamburgo (BR)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 17/836,679

(22) Filed: Jun. 9, 2022

(51) Int. Cl.
  *G06T 15/00* (2011.01)
  *G06T 17/00* (2006.01)
  *G06T 15/20* (2011.01)
  *G06T 15/04* (2011.01)

(52) U.S. Cl.
  CPC .......... *G06T 15/005* (2013.01); *G06T 15/04* (2013.01); *G06T 15/20* (2013.01); *G06T 17/005* (2013.01)

(58) Field of Classification Search
  None
  See application file for complete search history.

(56) References Cited

U.S. PATENT DOCUMENTS

| | | | | |
|---|---|---|---|---|
| 5,864,342 A * | 1/1999 | Kajiya | .............. | G06T 11/001 345/589 |
| 2015/0091892 A1* | 4/2015 | Kwon | .............. | G06T 15/005 345/419 |
| 2016/0027144 A1* | 1/2016 | Fernandez | .......... | G06T 15/005 345/522 |
| 2017/0358109 A1* | 12/2017 | Troiano | .............. | G06T 11/001 |

OTHER PUBLICATIONS

Marcos Balsa Rodriguez, Enrico Gobbetti, Fabio Marton, Ruggero Pintus, Giovanni Pintore, Alex Tinti, "Interactive exploration of gigantic point clouds on mobile devices", 2012, Eurographics, Proceedings: The 13th International Symposium on Virtual Reality, Archaeology and Cultural Heritage VAST (2012), pp. 57-64.*

Alun Evans, Javi Agenjo, Josep Blat, "Variable Penumbra Soft Shadows for Mobile Devices", Jan. 8, 2014, IEEE, Proceedings 2014 International Conference on Computer Graphics Theory and Applications (GRAPP).*

(Continued)

*Primary Examiner* — Robert Bader
(74) *Attorney, Agent, or Firm* — Ansari Katiraei LLP; Arman Katiraei; Sadiq Ansari

(57) ABSTRACT

A rendering system adapts textures used by a Graphics Processing Unit ("GPU") for the purpose of transferring data points of a point cloud to the GPU for processing and rendering. The rendering system determines the GPU constraints, and obtains a tree-based representation for the point cloud data points. The rendering system selects nodes from the tree-based representation that represent at least a first set of data points within the field-of-view with a first level of detail, that represent a second set of data points within the field-of-view with a different second level of detail, and that collectively satisfy the GPU constraints. The rendering system partitions a texture into chunks, encodes each chunk with data from different selected nodes, and presents an image based on rendered partial images generated by the GPU for the texture chunks.

13 Claims, 7 Drawing Sheets

(56) References Cited

OTHER PUBLICATIONS

Fang Meng, Hongbin Zha, "Efficient Streaming of Point-Based Models for Interactive 3-D Geometry Transmission", Jul. 20, 2003, IEEE, Proceedings 2003 IEEE International Symposium on Computational Intelligence in Robntics and Automation, pp. 441-446.*
Doomworld, "Risen3D. Max PNG Texture Size?", Jun. 19, 2016-Nov. 5, 2017, forum posting on website, retreived from https://www.doomworld.com/forum/topic/88978-risen3d-max-png-texture-size/ on Nov. 29, 2022.*

* cited by examiner

SYSTEMS AND METHODS FOR EFFICIENT RENDERING AND PROCESSING OF POINT CLOUDS USING TEXTURES

BACKGROUND

A point cloud may include millions or billions of data points for generating a high-resolution image of a three-dimensional ("3D") scene, object, or environment. The amount of data contained within a single rendered image of the point cloud may be several times larger than the available memory or buffer of a Graphics Processing Unit ("GPU"). Moreover, the rendering pipeline and compute units of the GPU may be implemented to accept and/or process meshes, polygons, textures, and/or other data structures instead of data points of a point cloud.

DETAILED DESCRIPTION OF PREFERRED EMBODIMENTS

The following detailed description refers to the accompanying drawings. The same reference numbers in different drawings may identify the same or similar elements.

Provided are systems and methods for the efficient rendering and processing of point clouds using textures and/or the buffer texture of a Graphics Processing Unit ("GPU"). In some embodiments, the systems and methods may dynamically generate a texture from a set of point cloud data points that fall within a field-of-view. Since the number of data points or aggregate data associated with the set of data points falling within the field-of-view may exceed the maximum texture size supported by the GPU, dynamically generating the texture may include preserving the detail and/or the number of data points encoded in the texture for dynamically determined important regions of the point cloud falling within the field-of-view, and decreasing the detail and/or the number of data points encoded in the texture for dynamically determined less important regions of the point cloud falling within the field-of-view. Consequently, the generated texture may adhere to size and formatting constraints of the GPU while still being adapted to transfer point cloud data points to the compute shaders and/or other compute units of the GPU. The compute shaders and/or other compute units may render the texture to produce a high-resolution image from the encoded point cloud data points at a desired frame rate.

Figure 1:
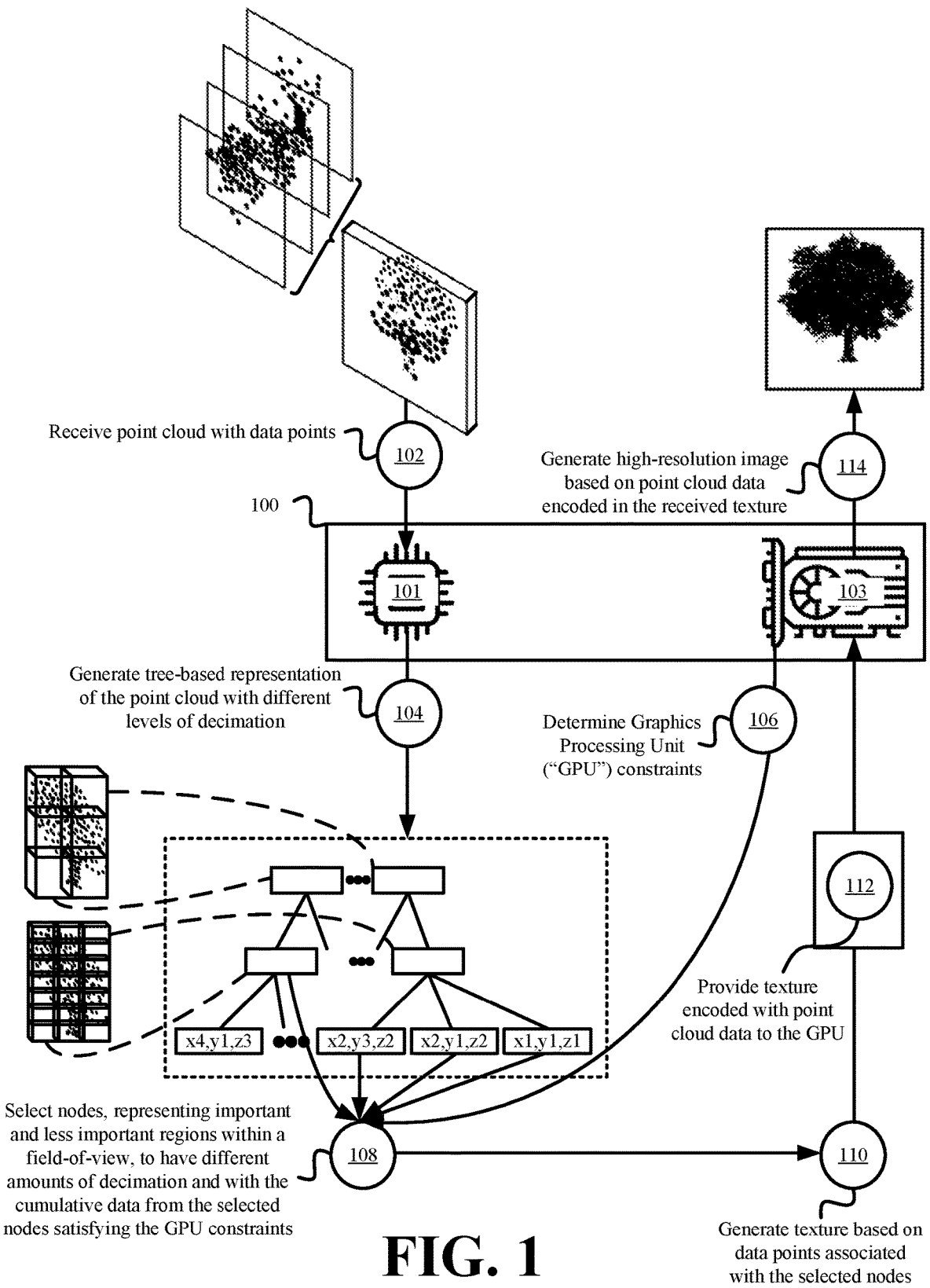
FIG. 1 illustrates an example for the efficient rendering and processing of a point cloud based on a dynamically encoded texture in accordance with some embodiments presented herein.

FIG. 1 illustrates an example for the efficient rendering and processing of a point cloud based on a dynamically encoded texture in accordance with some embodiments presented herein. As shown in FIG. 1, rendering system 100 may receive (at 102) a point cloud. Rendering system 100 may be a computing device that includes one or more hardware processors 101 (e.g., a Central Processing Unit ("CPU")) with one or more processing cores, and GPU 103 with one or more compute shaders and/or other specialized compute units for the processing and rendering of visual data.

The point cloud may be a file that represents a three-dimensional ("3D") scene, object, or environment using data points with different characteristics at different 3D positions. The point cloud data points may differ from pixels of a two-dimensional ("2D") image, because certain regions of the point cloud may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("IOR"), and/or other properties of the imaged surface, feature, or article.

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

The point cloud and the individual data points of the point clou may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments. The point cloud may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud.

In some embodiments, rendering system 100 may generate (at 104) a tree-based representation of the point cloud. In some other embodiments, the point cloud received (at 102) by rendering system may be defined as a binary tree, octree, k-dimensional ("k-d") tree, or other tree-like structure.

The leaf nodes of the tree-based representation may correspond to the individual point cloud data points, and may represent the maximum resolution or highest level of detail for the point cloud. Each tier that is removed from the leaf nodes includes one or more parent nodes for representing the connected or underlying children nodes (e.g., leaf nodes) or the region of space represented by the children nodes with a greater amount of decimation, with less detail, and/or with fewer data points. For instance, a parent node connected to three leaf nodes may represent the space populated by those three leaf nodes with a single node, and may average the color values and/or other non-positional elements of the three leaf nodes into a single set of color values and/or other non-positional elements.

Rendering system 100 may determine (at 106) size, performance, and/or other constraints of GPU 103. For instance, rendering system 100 may determine (at 106) the maximum size of a texture that GPU 103 may process and/or render in a particular execution cycle or that GPU 103 may process and/or render in order to maintain a specific frame rate. The constraints may be based on the amount of memory or the texture buffer size of GPU 103 as well as the number of compute shaders and/or other compute units that may be used to perform a parallel processing of textures and/or other visual data.

Rendering system 100 may select (at 108) different nodes from the tree-based representation of the point cloud that span the entirety of the scene or field-of-view being rendered, that preserve detail in dynamically determined important regions of the point cloud, that gradually reduce detail in dynamically determined less important regions of the point cloud, and that contain a cumulative amount of data that remains within the constraints of GPU 103. In other words, rendering system 100 may select (at 108) select nodes at different levels or tiers of the tree-based representation so that the cumulative data contained by the selected nodes equals or is less than the maximum texture size supported by GPU 103 and/or satisfies other constraints for rendering images at a particular frame rate and with a particular resolution.

Rendering system 100 may generate (at 110) a texture based on the data contained within the selected nodes. In some embodiments, rendering system 100 may map or allocate the data point data (e.g., positional and non-positional elements) from each selected node to a different chunk or part of the texture.

Rendering system 100 may provide (at 112) to GPU 103 for the compute shaders and/or other compute units of GPU 103 to process. In some embodiments, the compute shaders and/or other compute units of GPU 103 may be configured to process and/or render the point cloud data including the positional and non-positional elements of the data points associated with the selected nodes. Processing the point cloud data may include defining pixels of an image from the positional and non-positional elements of the data points associated with the selected nodes. Accordingly, GPU 103 may process that data point data in the texture in order to generate and present (at 114) a high-resolution image of the point cloud. In some embodiments, each compute shader or other compute unit of GPU 103 may process a different chunk of the texture corresponding to data from a different one or more of the selected nodes.

In this manner, rendering system 100 may adapt the texture to efficiently convey the point cloud data to the compute shaders and/or other compute units of GPU 103. Moreover, rendering system 100 may leverage the compute shaders and/or other compute units to perform a highly parallelized processing and rendering of the point cloud data, thereby generating the rendered image in less time and/or with fewer resources than the CPU and/or other hardware processors of rendering system 100.

Rendering system 100 may use different techniques to differentiate between important regions and less important regions of the scene or image being rendered. The important regions may correspond to regions within the field-of-view that are the focal points, contain visually important elements (e.g., text, numbers, etc.), contain foreground elements, contain differentiating detail (e.g., varying colors, changing surfaces, represent different objects, etc.), and/or contribute other differentiable detail of value within the field-of-view being rendered. The less important regions may correspond to regions that have a common or uniform presentation, lack differentiating detail (e.g., common colors, unchanging surfaces, represent a common object, etc.), contain background elements, contain a repeating visual element, are not focal points, and/or do not contribute other differentiable detail of value within the field-of-view being rendered.

Figure 2:
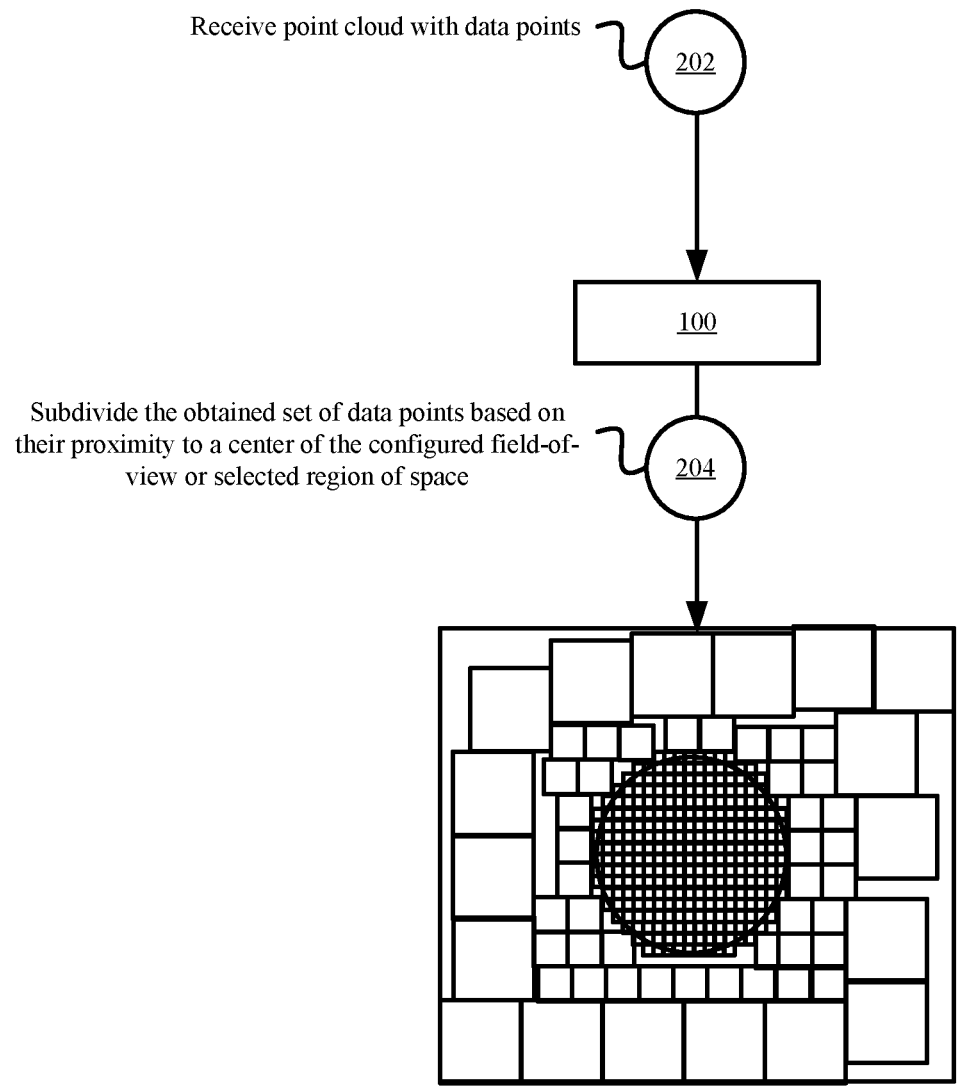
FIG. 2 illustrates an example of partitioning a point cloud between important and less important regions in accordance with some embodiments presented herein.

FIG. 2 illustrates an example of partitioning a point cloud between important and less important regions in accordance with some embodiments presented herein. Rendering system 100 may obtain (at 202) the set of data points from the point cloud that fall within a configured field-of-view or a selected region of space that is to be rendered.

Rendering system 100 may subdivide (at 204) the obtained set of data points based on their proximity to a center of the configured field-of-view or selected region of space. For instance, the focal point of an image is typically represented in the middle or at the center of the image. Accordingly, rendering system 100 may subdivide the data points at or around the center of the field-of-view into smaller or higher-resolution partitions than data points at the periphery or edges of the field-of-view.

FIG. 2 provides a conceptual visualization for subdividing (at 204) the field-of-view within the point cloud. As shown in FIG. 2, a cylinder may be projected onto a center of the field-of-view to designate the focal point. Data points in the field-of-view that are nearest to the center (e.g., inside the projected cylinder) are classified to be in the important regions and are preserved at the highest level of detail via the smallest subdivisions. In some embodiments, the smallest subdivisions may correspond to individual data points such that all data points are preserved and used in rendering the center of the field-of-view. Data points that are farther from the center (e.g., further away from the projected cylinder) are classified to be in progressively less important regions, and may be partitioned into progressively larger subdivisions. Each larger subdivision may correspond to an increased amount of decimation that is used to represent that region. In other words, a region with four data points may be decimated and represented with two data points when a first importance classification and a first amount of decimation associated with the first importance classification are applied to that region, and the same region may be decimated and represented with a single data point when a second importance classification, that is defined to be less important than the first importance classification, and a second amount of decimation associated with the second importance classification are applied to that region.

The subdivision of the rendered image is illustrated in FIG. 2 for conceptual purposes. Rendering system 100 may differentiate the important regions from the less important regions without rendering the set of data points. Specifically, rendering system 100 may differentiate the important regions from the less important regions based on the positional values of the set of data points and their distance from the field-of-view center.

Moreover, FIG. 2 may represent one technique for differentiating between different regions in the field-of-view. Rendering system 100 may use other techniques besides the central focal point to differentiate between important and less important regions of the field-of-view or scene to be rendered.

In some embodiments, rendering system 100 may determine the amount of variance in the color values and/or other non-positional elements of neighboring data points to determine the amount of detail represented by those neighboring data points. For instance, a first subset of neighboring data points with little color variation (e.g., RGB values differ by less than 10%) may be represented with fewer data points without losing any differentiable detail, and may therefore represent a less important region, whereas a second subset of neighboring data points with significant color variation (e.g., RGB values differ by more than 30%) may represent an important region with lots of differentiable detail that would be lost if the second subset of data points were decimated.

In some embodiments, rendering system 100 may compare the z-coordinate positions of the data points to differentiate data points of foreground objects from data points of background objects, and to differentiate the foreground objects as the important regions and the background objects as the less important regions. For instance, rendering system 100 may assign an importance value in relation to the data point's z-coordinate positional value. Rendering system 100 may assign a lower importance value to a data point the further the data point is in the background (e.g., the greater the z-coordinate value). In some such embodiments, rendering system 100 may determine the importance of a region based on the average z-coordinate positional values of the data points in that region.

In some embodiments, rendering system 100 may use artificial intelligence and/or machine learning ("AI/ML") techniques to inspect the positional and/or non-positional elements of the data points, and to differentiate the important regions from the less important regions based on detected variation in the positional and/or non-positional elements of the data points and specified AI/ML criteria for the variation that differentiates between the important regions and the less important regions. For instance, the AI/ML techniques may analyze the data points to identify representations of text, alphanumeric characters, and/or other symbols that correspond to important regions where the detail should be preserved and rendered with a maximum resolution, and to identify repeated colors that represent background sky, floor, and/or other elements that may be decimated without compromising the overall quality or important detail of the image.

Figure 3:
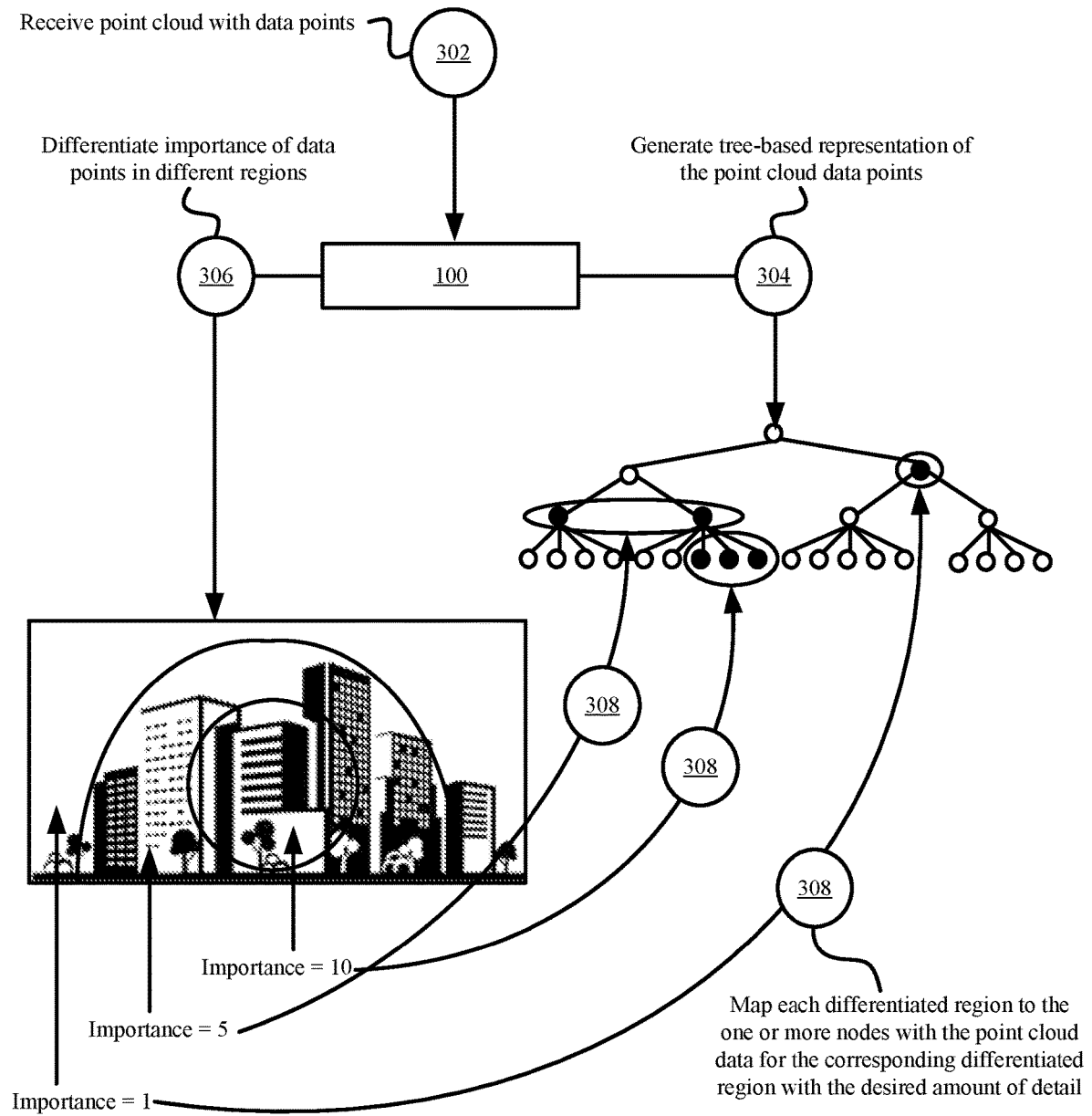
FIG. 3 illustrates an example of selecting nodes for a dynamically generated texture based on the differentiated regions within a field-of-view or selected scene in accordance with some embodiments presented herein.

FIG. 3 illustrates an example of selecting nodes for a dynamically generated texture based on the differentiated regions within a field-of-view or selected scene in accordance with some embodiments presented herein. Rendering system 100 may receive (at 302) a point cloud that represents a 3D capture of a cityscape, and may organize (at 304) the point cloud data points into a tree-based structure. Rendering system 100 may inspect the positional and/or non-positional elements of the data points that fall within a field-of-view of the scene that is to rendered, and may dynamically differentiate (at 306) between data points in important regions that should be rendered with the most detail or with all data points from data points in regions of progressively less importance that should be rendered with lesser detail or with less than all the data points. The important regions may correspond to the regions closest to the center of the field-of-view, and the regions of progressively lesser importance may correspond to the regions that are progressively farther from the center of the field-of-view.

Rendering system 100 may determine the nodes from the tree-based representation that represent each differentiated region with the desired amount of detail, and may map (at 308) each region to the one or more nodes with the point cloud data for the corresponding region with the desired amount of detail. For instance, rendering system 100 may map (at 308) the most important regions to the leaf nodes for the individual data points that fall within each of the most important regions. Rendering system 100 may map (at 308) the less important regions to the parent nodes that represent each of the less important regions with the desired level of detail associated with that less important region. For instance, a first region differentiated with a first level of importance (e.g., greatest importance or importance equal to a value of 10 in a scale of 1 to 10) that is associated with a first level of detail may map (at 308) to nodes at the leaf level or lowest level of the tree-based representation, a second region differentiated with second first level of importance (e.g., medium importance or importance equal to a value of 5 in a scale of 1 to 10) that is associated with a second level of detail may map (at 308) to nodes in a second level of the tree-based representation that is one level removed from the leaf nodes, and a third region differentiated with a third level of importance (e.g., least importance or importance equal to a value of 1 in the scale of 1 to 10) that is associated with a third level of detail may map (at 308) to nodes in a third level of the tree-based representation that is two levels removed from the leaf nodes.

In some embodiments, each node at each level may contain the same amount of data. For instance, each node may correspond to a single data point with a single set of positional and non-positional elements, or may correspond to a set of 100 data points that are distributed across different sized regions corresponding to the level of the tree-based representation where the nodes are located. In some other embodiments, each node at each level may contain a varying amount of data. For instance, a node at a first level of the tree-based representation may contain twice the data as a node at a second level of the tree-based representation.

Rendering system 100 may perform a similar partitioning of the texture that is used to transfer the point cloud data to the GPU compute shaders and/or other compute units. In some embodiments, rendering system 100 may create a texture for each image of the point cloud that is to be rendered with a size that is equal to the maximum texture size supported by the GPU. Rendering system 100 may then subdivide the texture into a set of chunks, may assign unique identifiers to each chunk, and may assign the data point data associated with different selected nodes from the tree-based representation to each chunk in order to encode the point cloud data at the different quality levels for a current field-of-view in the texture.

Figure 4:
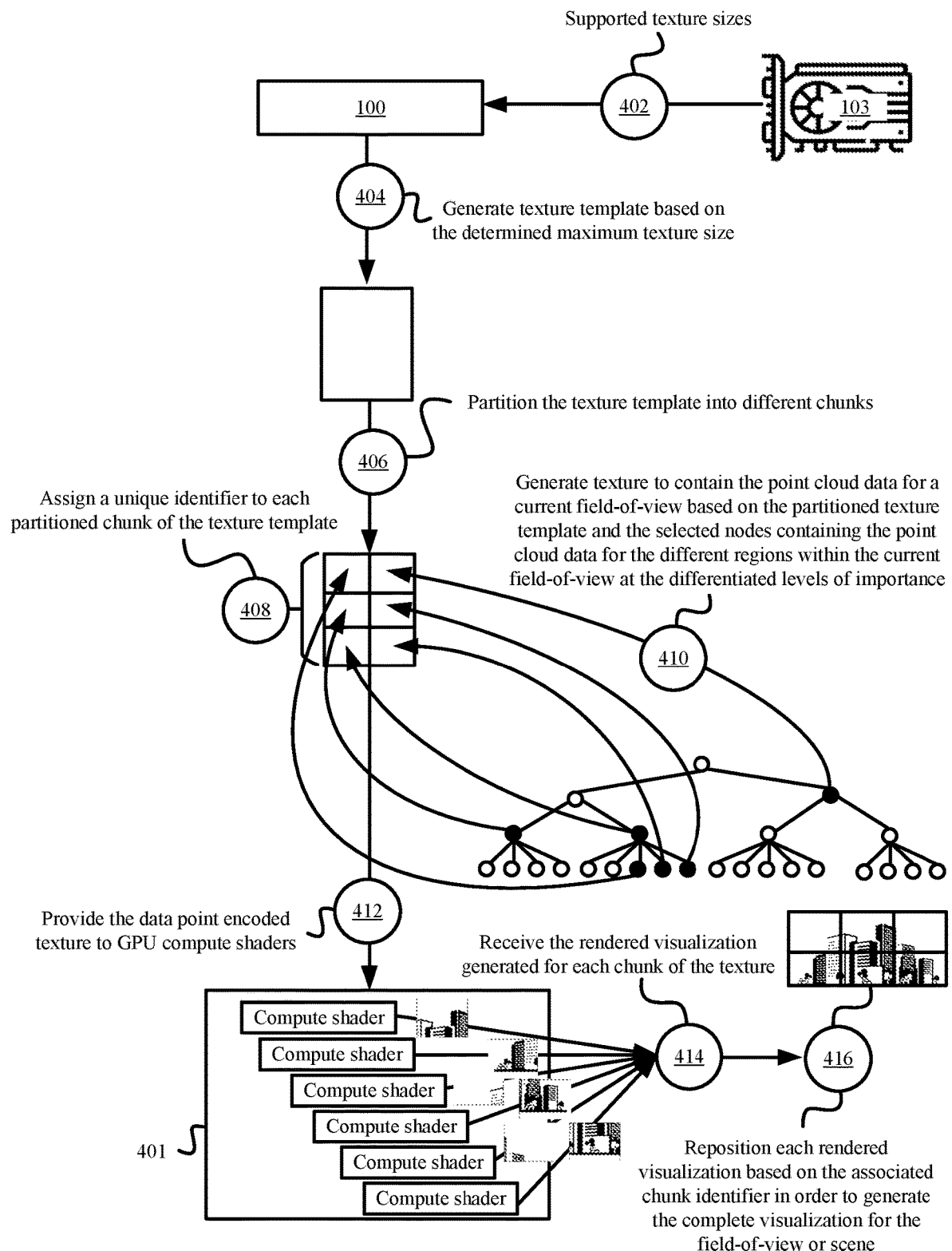
FIG. 4 illustrates an example of dynamically generating a texture to contain point cloud data in accordance with some embodiments presented herein.

FIG. 4 illustrates an example of dynamically generating a texture to contain point cloud data in accordance with some embodiments presented herein. Rendering system 100 may query GPU 103 that is used to render the point cloud data, and may obtain (at 402) the maximum texture size supported by that GPU 103. The maximum texture size may be based on the available video memory or Random Access Memory ("RAM") of GPU 103.

In some embodiments, GPU 103 may be part of the same system or device that executes rendering system 100. In some other embodiments, rendering system 100 may remotely access different GPUs 103 of different devices (e.g., cloud hosted nodes) via a data network, and may select, configure, and use different GPUs 103 for different rendering tasks.

Rendering system 100 may generate (at 404) a texture template based on the determined maximum texture size. The texture template may be an empty texture.

Rendering system 100 may partition (at 406) the texture template into different chunks. Each chunk may be associated with the same number or a fixed number of pixels from the texture template. In other words, each chunk may correspond to a non-overlapping segment of the texture that may be used to store an equal amount of data. In some embodiments, rendering system 100 may partition (at 406) the texture template into chunks that may contain and/or store the same amount of data as one or more nodes from the tree-based representation of the point cloud, or some data from some maximum number of data points.

Rendering system 100 may assign (at 408) a unique identifier to each partitioned chunk of the texture template. Each unique identifier may identify the position of a corresponding chunk within the texture.

Rendering system 100 may generate (at 410) a texture to contain the point cloud data for a current field-of-view based on the partitioned texture template and the selected nodes containing the point cloud data for the different regions within the current field-of-view at the differentiated levels of detail or differentiated levels of importance. Accordingly, generating (at 410) the texture may include encoding different chunks of the texture with point cloud data from different nodes representing different subsets of data points in different regions of the point cloud within the current field-of-view or the scene to be rendered.

In some embodiments, each node or set of nodes may contain the point cloud data for a different region of the point cloud with a different level of detail and/or with a different amount of decimation. Accordingly, a first chunk of the texture may be encoded with the data point data associated with a first node or first set of nodes that represent the visual data from a first point cloud region of a first size, and a second chunk of the texture may be encoded with the data point data associated with a second node or second set of nodes that contain the same amount of point cloud data as the first node or the first set of nodes, and that represent the visual data from a second point cloud region of a different second size. The first chunk may therefore contain data from a first set of data points for generating a visualization for the first point cloud region of the first size, and the second chunk may contain the data from a different second set of data points, that may be about equal in number to the first set of data points, and that generate a visualization for the second point cloud region of the second size that may be smaller or larger than the first size. In other words, the texture chunks may contain the same amount of data, but that same amount of data may generate a larger or smaller portion of the field-of-view or scene than other chunks.

In some embodiments, rendering system 100 may generate (at 410) the texture by linking one or more selected nodes of the tree-based representation to a different chunk of the texture template. For instance, rendering system 100 may associate a node identifier to a chunk identifier, may associate the point cloud data of a selected node to a chunk represented by a linked identifier, or may tag the selected nodes from the tree-based representation with the chunk identifiers of the linked chunks.

Rendering system 100 may provide (at 412) the dynamically generated texture to compute shaders 401 and/or other compute units of GPU 103. Compute shaders 401 and/or other compute units may perform a parallel rendering of the point cloud data that is mapped to different chunks of the texture. For instance, each compute shader 401 may be tasked with rendering the point cloud data associated with a different texture chunk. The texture chunks need not correspond to sequential regions of the point cloud or sequential segments of the final rendered image.

Rendering system 100 may receive (at 414) the rendered visualization generated for each chunk of the texture and/or generated by each compute shader 401. Based on the chunk identifier associated with each rendered visualization or texture chunk that resulted in rendered visualizations output by different compute shaders 401, rendering system 100 may reposition (at 416) each rendered visualization in a correct location based on the associated chunk identifier in order to generate the complete visualization for the field-of-view or scene.

Figure 5:
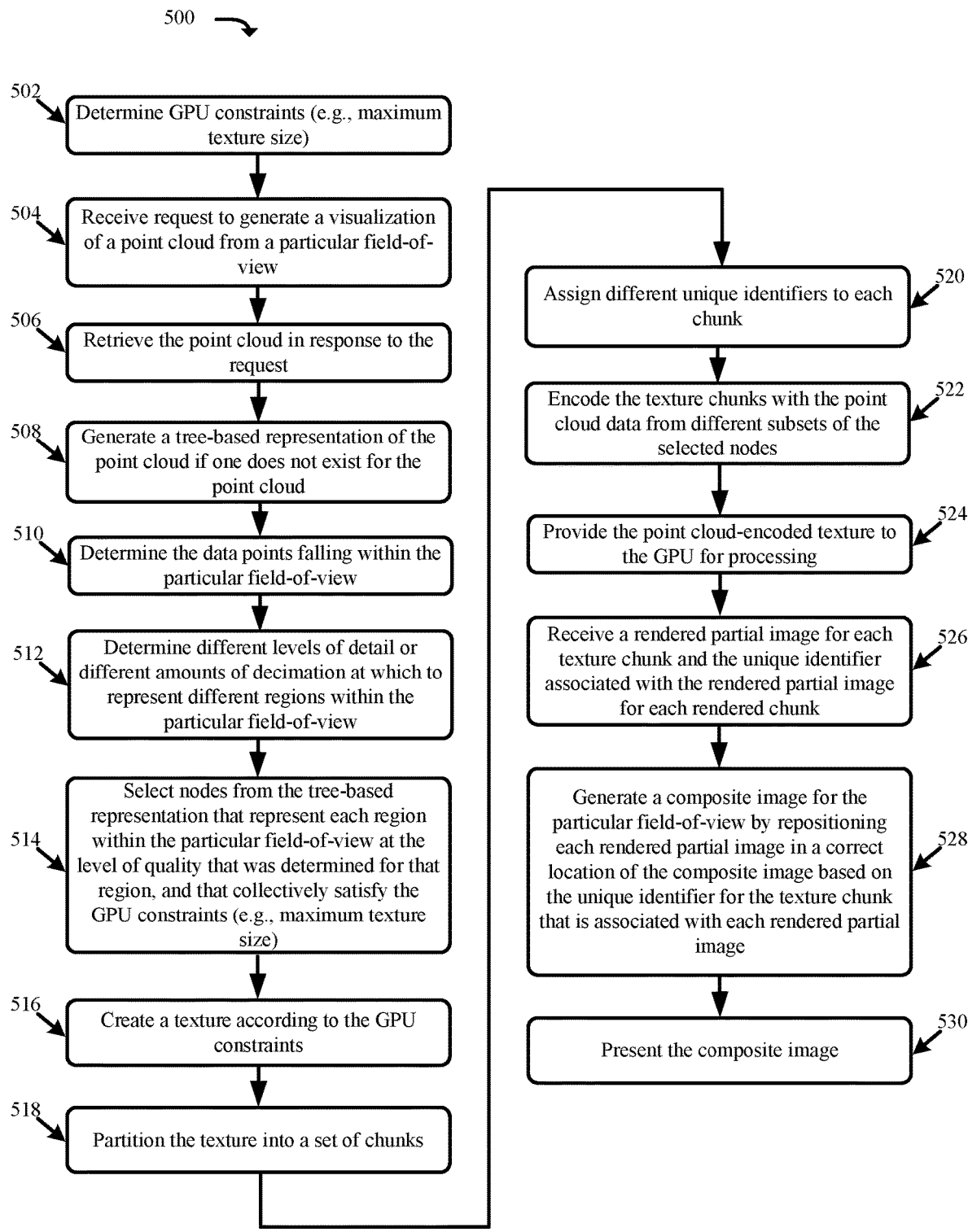
FIG. 5 presents a process for the texture-based rendering of a point cloud in accordance with some embodiments presented herein.

FIG. 5 presents a process 500 for the texture-based rendering of a point cloud in accordance with some embodiments presented herein. Process 500 may be performed by rendering system 100 using one or more processing cores of one or more CPUs or other hardware processors, and one or more compute shaders and/or other compute units of a GPU.

Process 500 may include determining (at 502) constraints of a GPU that will be used for the rendering of a point cloud. For instance, rendering system 100 may query the GPU using a system call, an Application Programming Interface ("API") call, or another call to determine the amount of available GPU memory, the maximum texture size supported by the GPU, and/or the maximum size of textures that can be processed at a given frame rate by the GPU.

Process 500 may include receiving (at 504) a request to generate a visualization of a point cloud or another file with a set of data points that are distributed in a 3D space from a particular field-of-view. The request may provide the name, file path, Uniform Resource Locator ("URL"), and/or other identifier for locally or remotely accessing the point cloud. The request may also define the particular field-of-view by providing a position, orientation, and/or other properties for a virtual camera within the point cloud. The request may be to render the entirety of the point cloud in one image, or less than all of the point cloud in one image (e.g., a zoomed-in or focused part of the point cloud).

Process 500 may include retrieving (at 506) the point cloud in response to the request, and/or generating (at 508) a tree-based representation of the point cloud if one does not already exist for the point cloud in the retrieved file. In some embodiments, the point cloud may be stored as a binary tree, octree, k-d tree, or other tree-based representation such that the generation (at 508) operation may be avoided. In some other embodiments, generating (at 508) the tree-based representation may include defining the point cloud with different levels of decimation. For instance, rendering system 100 may define the leaf nodes of the tree-based representation based on the point cloud data points, and may define parent nodes that represent the positional and/or non-positional elements for groups of underlying leaf nodes and/or other children nodes.

Process 500 may include determining (at 510) the data points falling within the particular field-of-view. For instance, rendering system 100 may determine coordinates for the view frustum or the particular field-of-view, and may compare the determined coordinates against the positional values of the point cloud data points to identify which data points fall within the particular field-of-view.

Process 500 may include determining (at 512) different levels of detail or different amounts of decimation at which to represent different regions within the particular field-of-view. In some embodiments, rendering system 100 may determine (at 512) the different levels of detail for the different regions within the particular field-of-view by generating the focal point projection (e.g., a cylindrical projection or other identification of the particular field-of-view focal point) in order to set a higher level of detail for the data points located within or nearest the focal point, and a progressively lower level of detail for the data points that are further away from the focal point. In some embodiments, rendering system 100 may determine (at 512) the different levels of detail for the different regions within the particular field-of-view by comparing positional and/or non-positional elements of neighboring data points to differentiate regions with lots of visual differentiation from regions with little visual differentiation (e.g., lots of variation in the non-positional elements of neighboring data points versus little variation in the non-positional elements of neighboring data points). In some embodiments, rendering system 100 may determine (at 512) the different levels of detail by using various AI/ML techniques to quantify or evaluate the importance of the point cloud data or visual information in the different regions. For instance, rendering system 100 may implement the AI/ML techniques to differentiate between one or more focal points, foreground elements, visually important regions, and/or highly-detailed regions from periphery or background elements, regions with little or no variation, and/or low-detailed regions. Determining (at 512) the levels of detail may include providing a score to each subset of data points in the particular field-of-view based on the determined importance of each subset of data points to the image quality and/or scene being rendered.

Process 500 may include selecting (at 514) different nodes from the tree-based representation that represent each region within the particular field-of-view at the level of quality or with the amount of decimation that was determined (at 512) for that region, and that collectively satisfy the GPU constraints (e.g., maximum texture size). Accordingly, the selection (at 514) may be biased or impacted by the maximum texture size supported the GPU. For instance, if the total amount of data for the selected nodes is greater than the maximum texture size, rendering system 100 may replace some of the selected nodes with a node at a higher level of the tree-based representation that represents the same region with less data, that represents the same region with greater decimation, or that covers the region spanned by two or more of the replaced nodes.

In performing the selection (at 514), rendering system 100 may dynamically increase or decrease the amount of decimation at different regions of the particular field-of-view to preserve as much detail as possible while still satisfying the GPU constraints (e.g., maximum texture size). If the total amount of data associated with the selected nodes is less than the maximum texture size, rendering system 100 may decrease the amount of decimation and increase the detail level for a particular region within the particular field-of-view by selecting one or more nodes that represent that particular region and that are at a lower level and/or contain more detail for the particular region than the currently selected node. Similarly, if the total amount of data associated with the selected nodes exceeds the maximum texture size, rendering system 100 may select two or more nodes representing a least or lesser important region within the particular field-of-view, and may replace the point cloud data associated with the two or more nodes with the point cloud data from a single parent node of the two or more nodes.

Process 500 may include creating (at 516) a texture according to the GPU constraints such as the maximum texture size supported by the GPU, and partitioning (at 518) the texture into a set of chunks. Rendering system 100 may partition (at 518) the texture into equal sized chunks or chunks of different sizes based on the amount of data contained in each of the selected nodes from the tree-based representation. In some embodiments, rendering system 100 may partition (at 518) the texture in a number of chunks that is equal to the number of compute shaders and/or other compute units of the GPU that are available for rendering the point cloud data. In some embodiments, rendering system 100 may partition (at 518) the texture into some number of chunks that is proportional to the number of selected nodes. For instance, rendering system 100 may partition (at 518) the texture so that there is one chunk for every three selected nodes.

Process 500 may include assigning (at 520) different unique identifiers to each chunk. The unique identifier may be value that identifies a position of the assigned chunk within the overall texture.

Process 500 may include encoding (at 522) the texture chunks with the point cloud data from different subsets of the selected nodes. The encoding (at 522) may include mapping, linking, or otherwise associating different selected nodes to the unique identifier of a different texture chunk, and/or copying the positional and non-positional element values for the data points of a selected node to the chunk of the texture that the selected node is mapped to. The encoding (at 522) may ensure that the amount of data that may be stored by each texture chunk is maximized, and may map the selected nodes in a nonsequential manner so that all the point cloud data from the selected nodes is mapped across the texture chunks. Accordingly, the encoding (at 522) may store the data points at the different regions of the particular field-of-view specified with the different amounts of decimation and/or levels of detail across different parts or chunks of the texture.

Process 500 may include providing (at 524) the point cloud-encoded texture to the GPU for processing. In some embodiments, providing (at 524) the point cloud-encoded texture may include configuring the compute shaders and/or other compute units of the GPU with the processing operations needed to render that point cloud data associated with texture chunk. For instance, the compute shaders and/or other GPU compute units may be configured to convert the positional and non-positional elements from one or more data points stored within a texture chunk into one or more pixels with color values and/or other visual characteristics that match the color values and/or other visual characteristics specified in the non-positional elements of the data points. In some embodiments, providing (at 524) the point cloud-encoded texture may also include assigning the data stored in different chunks of the texture to different compute shaders and/or compute units in order to parallelize the processing and to provide an equal amount of work to each compute shader and/or compute unit.

Process 500 may include receiving (at 526) visual data or a rendered partial image for each texture chunk and the unique identifier associated with the visual data or rendered partial image for each rendered chunk. In some embodiments, each compute shader may output the visual data or a rendered partial image for a different chunk of the texture, and the outputs from the compute shaders may be received by rendering system 100.

Process 500 may include generating (at 528) a composite image for the particular field-of-view by repositioning each rendered partial image in a correct location of the composite image based on the unique identifier for the texture chunk that is associated with each rendered partial image. Process 500 may include presenting (at 530) the composite image on a display or in an application where the point cloud may be modified, moved, edited, and/or otherwise interacted with.

Rendering system 100 may use the texture chunk identifiers to efficiently render a next scene or image of an animation or movement within the point cloud. Specifically, rendering system 100 may determine data points, regions, and/or nodes that fall out of the field-of-view, may release the chunk identifiers associated with those data points, regions, and/or nodes, and may use the chunks associated with released chunk identifiers to store the point cloud data for new data points, regions, and/or nodes that were not previously in the field-of-view and are now in the field-of-view. Consequently, rendering system 100 need not recreate the texture for each frame of an animation or movement within a point cloud. Instead, rendering system 100 may simply update specific chunks of the texture that previously stored point cloud data from nodes that are no longer in the field-of-view with point cloud data from nodes that have entered into the field-of-view in the current frame of the animation. Moreover, rendering system 100 may reuse the rendered partial images from unaffected texture chunks such that the GPU may be used to render only the updated chunks of the texture, and the resulting rendered partial images for the updated chunks may be combined with existing rendered partial images from the unaffected texture chunks in order to generate the final composite image.

Figure 6:
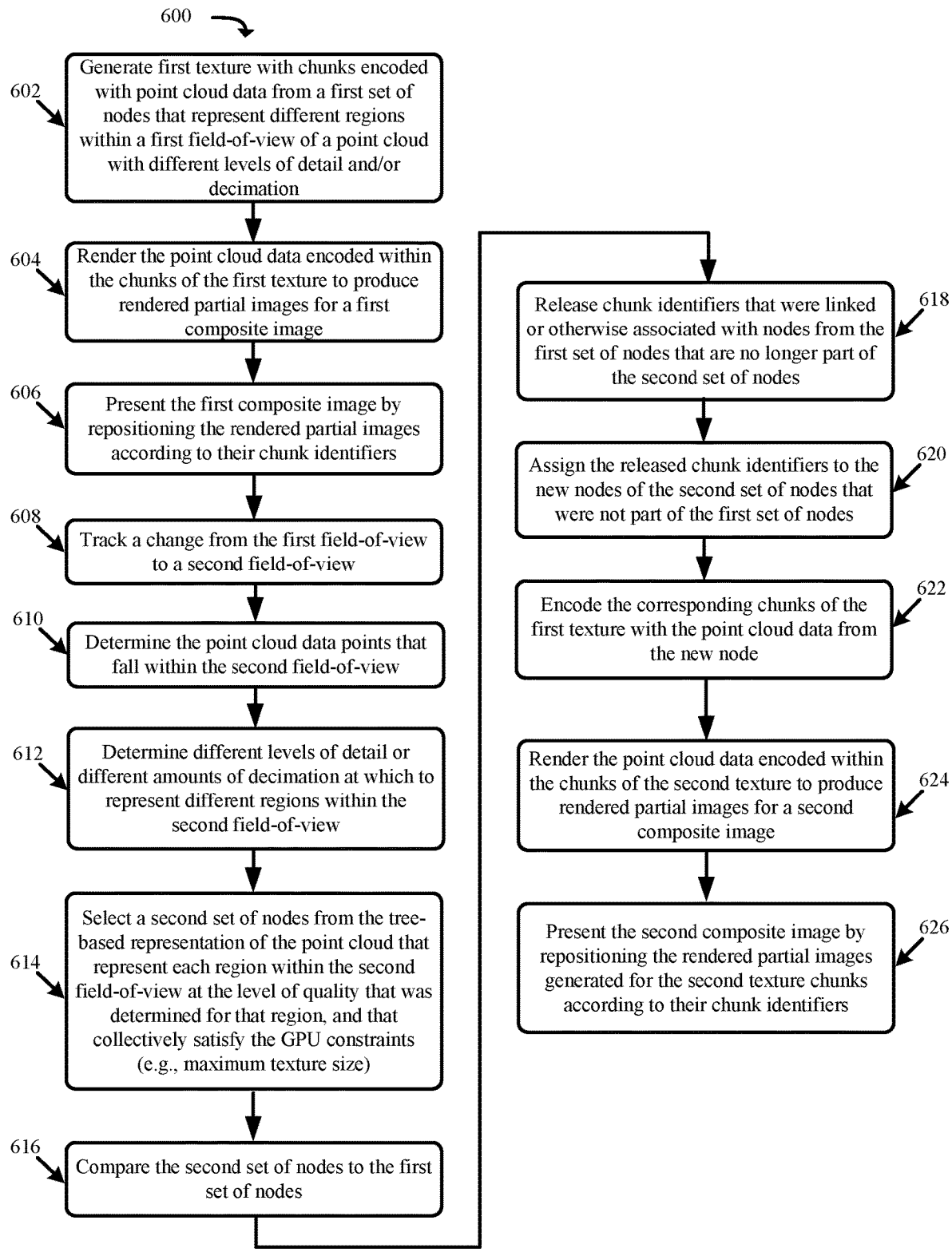
FIG. 6 presents a process for updating the point cloud-encoded texture to efficiently render different frames of a point cloud animation in accordance with some embodiments presented herein.

FIG. 6 presents a process 600 for updating the point cloud-encoded texture to efficiently render different frames of a point cloud animation in accordance with some embodiments presented herein. Process 600 may be implemented by rendering system 100.

Process 600 may include dynamically generating (at 602) a first texture with chunks that are encoded with point cloud data from a first set of nodes that represent different regions within a first field-of-view of a point cloud with different levels of detail and/or decimation, rendering (at 604) the point cloud data encoded within the chunks of the first texture to produce rendered partial images for a first composite image, and presenting (at 606) the first composite image by repositioning the rendered partial images generated for the first texture chunks according to their chunk identifiers. Rendering (at 604) the point cloud data may include passing and/or transferring the first texture to the GPU compute shaders and/or other compute units, and utilizing the compute shaders and/or other compute units to perform a parallelized processing of the point cloud data that is encoded in different chunks of the first texture.

Process 600 may include tracking (at 608) a change from the first field-of-view to a second field-of-view. The field-of-view may change in response to user input that moves a virtual camera from a first position or orientation to a second position or orientation within the point cloud. The field-of-view may also change programmatically based on a defined animation for the point cloud.

Process 600 may include determining (at 610) the point cloud data points that fall within the second field-of-view, determining (at 612) different levels of detail or different amounts of decimation at which to represent different regions within the second field-of-view, and selecting (at 614) a second set of nodes from the tree-based representation of the point cloud that represent each region within the second field-of-view at the level of quality that was determined for that region, and that collectively satisfy the GPU constraints (e.g., maximum texture size). In some embodiments, rendering system 100 may avoid analyzing all the data points in the second field-of-view anew by tracking which data points change from the first field-of-view to the second field-of-view, and selecting nodes from the tree-based representation to represent the changed data points with a differentiated level of detail or amount of decimation for the region encompassed by the changed data points such that the newly selected nodes together with the retained nodes from the first set of nodes that remain within the second field-of-view satisfy the GPU constraints. When there is significant change between the first and second fields-of-view that cause the focal point to change, rendering system 100 may be unable to reuse some or all of the first set of nodes that remain in the second field-of-view because the change in the focal point may cause a change in the level of detail or decimation for the regions represented by those nodes.

Process 600 may include comparing (at 616) the second set of nodes to the first set of nodes. Based on the comparison (at 616), rendering system 100 may determine which nodes of the first set of nodes from the first field-of-view remain within the second field-of-view, which nodes of the first set of nodes are no longer within the second field-of-view, and which new nodes were previously outside the first field-of-view and are now included as part of the second field-of-view.

Process 600 may include releasing (at 618) chunk identifiers that were linked or otherwise associated with nodes from the first set of nodes that are no longer part of the second set of nodes. Accordingly, the texture chunks identified by the released chunk identifiers are now available for reassignment. In some embodiments, releasing (at 618) the chunk identifiers need not include erasing or deleting the point cloud data that was encoded to the texture chunks identified by the chunk identifiers.

Process 600 may include assigning (at 620) the released chunk identifiers to the new nodes of the second set of nodes that were not part of the first set of nodes, and encoding (at 622) the corresponding chunks of the first texture with the point cloud data from the new node. The encoding (at 622) may include overwriting the point cloud data of the one or more replaced nodes from the first set of nodes with the point cloud data of the new nodes from the second set of nodes while retaining the point cloud data that was previously written to other chunks of texture for nodes of the first set of nodes that remain within the second field-of-view and are included as part of the second set of nodes. Accordingly, rendering system 100 does not recreate the texture anew for every frame or image of the animation. Instead, rendering system 100 may update just the parts of the first texture that contain point cloud data inside the first field-of-view but outside the current second field-of-view with the new point cloud data that was outside the first field-of-view and is now inside the current second field-of-view. The encoding (at 622) may generate a second texture with various chunks containing the same point cloud data as corresponding chunks of the first texture.

Process 600 may include rendering (at 624) the point cloud data encoded within the chunks of the second texture to produce rendered partial images for a second composite image, and presenting (at 626) the second composite image by repositioning the rendered partial images generated for the second texture chunks according to their chunk identifiers. Once again, rendering (at 624) the point cloud data may include passing and/or transferring the second texture to the GPU compute shaders and/or other compute units, and utilizing the compute shaders and/or other compute units to perform a parallelized processing of the point cloud data that is encoded in different chunks of the second texture.

Process 600 may repeat at a specified frame rate or whenever the field-of-view within the point cloud changes. In this manner, rendering system 100 may leverage the highly parallelized processing provided by the GPU to render images based on data points that are distributed within a 3D space using textures that are supported by the GPU.

Figure 7:
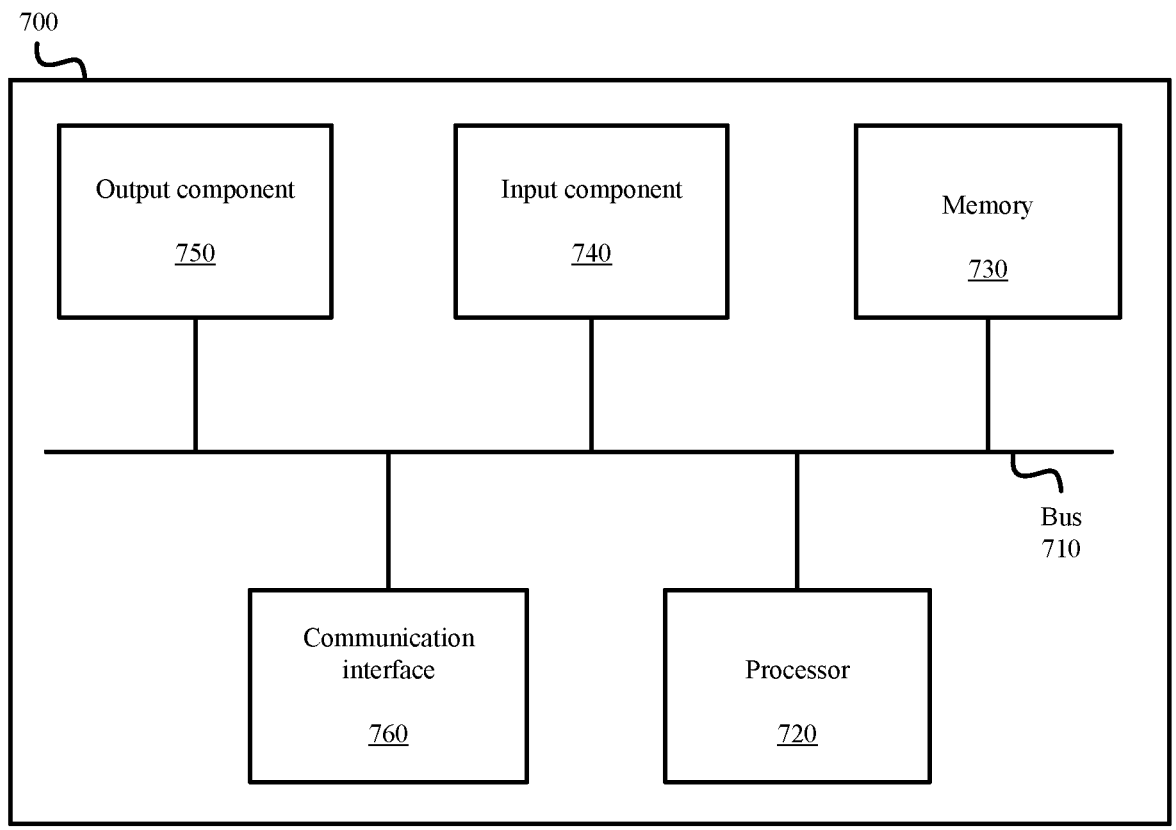
FIG. 7 illustrates example components of one or more devices, according to one or more embodiments described herein.

FIG. 7 is a diagram of example components of device 700. Device 700 may be used to implement one or more of the devices or systems described above (e.g., rendering system 100, the computing device executing rendering system 100, the computing device with the GPU, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining one or more constraints of a hardware processor that is used for image rendering;
   obtaining a tree-based representation of a plurality of data points that are distributed within a three-dimensional ("3D") space, wherein the tree-based representation comprises a plurality of nodes that represent different subsets of the plurality of data points in different regions of the 3D space with different levels of detail;
   receiving a request to render the 3D space from a particular field-of-view;
   selecting a set of the plurality of nodes that represent at least a first set of data points within the particular field-of-view with a first level of detail, that represent a second set of data points within the particular field-of-view with a different second level of detail, and that collectively satisfy the one or more constraints of the hardware processor;
   partitioning a texture into a plurality of chunks;
   assigning an identifier to each chunk of the plurality of chunks, wherein the identifier identifies a position of each chunk within the texture;
   encoding each chunk of the plurality of chunks with data from one or more different nodes of the set of nodes;
   presenting an image of the particular field-of-view based on a plurality of rendered partial images generated by of the hardware processor for the plurality of chunks of the texture;
   detecting a change from the particular field-of-view to a second field-of-view;
   determining a subset of nodes from the set of nodes that are not in the second field-of-view;
   releasing a set of identifiers assigned to a subset of the plurality of chunks that are encoded with the data from the subset of nodes;
   determining new nodes of the tree-based representation that are not in the particular field-of-view and that are in the second field-of-view; and
   associating the set of identifiers to the new nodes.

2. The method of claim 1 further comprising:
   providing the texture to the hardware processor; and
   performing a parallelized rendering of the set of nodes by rendering a different subset of the plurality of chunks with a different compute unit of the hardware processor.

3. The method of claim 1 further comprising:
   differentiating a plurality of regions within the particular field-of-view based on importance; and
   wherein selecting the set of nodes comprises:
      determining that the set of nodes represent each particular region of the plurality of regions with a level of detail that is associated with the importance of the particular region and that data contained by the set of nodes does not exceed the one or more constraints.

4. The method of claim 1, wherein different nodes at different tiers of the tree-based representation represent a same region of the 3D space with different amounts of data point decimation.

5. The method of claim 1 further comprising:
   generating the image of the particular field-of-view by arranging the plurality of rendered partial images based on an association between each particular rendered partial image of the plurality of rendered partial images and the identifier of a chunk from the plurality of chunks that contained the data for that particular rendered partial image.

6. The method of claim 1 further comprising:
   updating the texture by overwriting the data in the subset of chunks with the data from the new nodes and by retaining the data encoded in other chunks of the plurality of chunks; and
   presenting a second image of the second field-of-view based on newly rendered partial images generated by the hardware processor from the data in the subset of chunks that were overwritten with the data from the new nodes.

7. The method of claim 1 further comprising:
   differentiating the first set of data points in a first region of the particular field-of-view from the second set of data points in a second region of the particular field-of-view based on differences between positions or non-positional values of the first set of data points and the second set of data points;
wherein selecting the set of nodes comprises:
selecting a first subset of nodes with the first level of detail for the first set of data points, and a second subset of nodes with the second level of detail for the second set of data points based on said differentiating.

8. The method of claim 1 further comprising:
configuring a plurality of compute units of the hardware processor to render the data from the set of nodes encoded within the plurality of chunks of the texture, wherein the data comprises positional elements and non-positional elements for different data points that are distributed within the 3D space.

9. A system comprising:
a first hardware processor used for image rendering; and
a second hardware processor configured to:
determine one or more constraints of the first hardware processor;
obtain a tree-based representation of a plurality of data points that are distributed within a three-dimensional ("3D") space, wherein the tree-based representation comprises a plurality of nodes that represent different subsets of the plurality of data points in different regions of the 3D space with different levels of detail;
receive a request to render the 3D space from a particular field-of-view;
select a set of the plurality of nodes that represent at least a first set of data points within the particular field-of-view with a first level of detail, that represent a second set of data points within the particular field-of-view with a different second level of detail, and that collectively satisfy the one or more constraints of the hardware processor;
partition a texture into a plurality of chunks;
assign an identifier to each chunk of the plurality of chunks, wherein the identifier identifies a position of each chunk within the texture;
encode each chunk of the plurality of chunks with data from one or more different nodes of the set of nodes;
present an image of the particular field-of-view based on a plurality of rendered partial images generated by the first hardware processor for the plurality of chunks of the texture;
detect a change from the particular field-of-view to a second field-of-view;
determine a subset of nodes from the set of nodes that are not in the second field-of-view;
release a set of identifiers assigned to a subset of the plurality of chunks that are encoded with the data from the subset of nodes;
determine new nodes of the tree-based representation that are not in the particular field-of-view and that are in the second field-of-view; and
associate the set of identifiers to the new nodes.

10. The system of claim 9, wherein the second hardware processor is further configured to:
provide the texture to the first hardware processor; and
perform a parallelized rendering of the set of nodes by rendering a different subset of the plurality of chunks with a different compute unit of the first hardware processor.

11. The system of claim 9, wherein the second hardware processor is further configured to:
generate the image of the particular field-of-view by arranging the plurality of rendered partial images based on an association between each particular rendered partial image of the plurality of rendered partial images and the identifier of the chunk from the plurality of chunks that contained the data for that particular rendered partial image.

12. The system of claim 9, wherein the second hardware processor is further configured to:
update the texture by overwriting the data in the subset of chunks with the data from the new nodes and by retaining the data encoded in the other chunks of the plurality of chunks; and
present a second image of the second field-of-view based on newly rendered partial images generated by the first hardware processor from the data in the subset of chunks that were overwritten with the data from the new nodes.

13. A non-transitory computer-readable medium storing program instructions that, when executed by one or more hardware processors of a rendering system, cause the rendering system to perform operations comprising:
determine one or more constraints of a hardware processor that is used for image rendering;
obtain a tree-based representation of a plurality of data points that are distributed within a three-dimensional ("3D") space, wherein the tree-based representation comprises a plurality of nodes that represent different subsets of the plurality of data points in different regions of the 3D space with different levels of detail;
receive a request to render the 3D space from a particular field-of-view;
select a set of the plurality of nodes that represent at least a first set of data points within the particular field-of-view with a first level of detail, that represent a second set of data points within the particular field-of-view with a different second level of detail, and that collectively satisfy the one or more constraints of the hardware processor;
partition a texture into a plurality of chunks;
assign an identifier to each chunk of the plurality of chunks, wherein the identifier identifies a position of each chunk within the texture;
encode each chunk of the plurality of chunks with data from one or more different nodes of the set of nodes;
present an image of the particular field-of-view based on a plurality of rendered partial images generated by the hardware processor for the plurality of chunks of the texture;
detect a change from the particular field-of-view to a second field-of-view;
determine a subset of nodes from the set of nodes that are not in the second field-of-view;
release a set of identifiers assigned to a subset of the plurality of chunks that are encoded with the data from the subset of nodes;
determine new nodes of the tree-based representation that are not in the particular field-of-view and that are in the second field-of-view; and
associate the set of identifiers to the new nodes.

* * * * *